United States Patent
Akhavain Mohammadi et al.

(10) Patent No.: US 9,647,925 B2
(45) Date of Patent: May 9, 2017

(54) SYSTEM AND METHOD FOR DATA PATH VALIDATION AND VERIFICATION

(71) Applicant: Huawei Technologies Co., Ltd., Shenzhen (CN)

(72) Inventors: Mehdi Arashmid Akhavain Mohammadi, Ottawa (CA); Peter Ashwood-Smith, Gatineau (CA); Tao Wan, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 14/533,729

(22) Filed: Nov. 5, 2014

(65) Prior Publication Data
US 2016/0127219 A1    May 5, 2016

(51) Int. Cl.
*G06F 15/16*    (2006.01)
*G06F 15/173*   (2006.01)
*H04L 12/751*   (2013.01)
*H04L 12/741*   (2013.01)

(52) U.S. Cl.
CPC .............. *H04L 45/02* (2013.01); *H04L 45/74* (2013.01)

(58) Field of Classification Search
CPC ................................ H04L 45/02; H04L 45/74
USPC ......................................................... 709/224
See application file for complete search history.

(56) References Cited

U.S. PATENT DOCUMENTS

| 8,116,227 B1 | 2/2012 | Prairie et al. |
| 8,310,957 B1 * | 11/2012 | Rekhter ............. H04L 12/4641 370/256 |
| 8,428,056 B2 * | 4/2013 | Rogers ................ H04L 12/5695 370/218 |

(Continued)

FOREIGN PATENT DOCUMENTS

| CN | 101304345 A | 11/2008 |
| CN | 102158864 A | 8/2011 |
| EP | 1463245 A2 | 9/2004 |

OTHER PUBLICATIONS

Anderson, L., et al., "Multiprotocol Label Switching (MPLS) Label Stack Entry: "EXP" Field Renamed to "Traffic Class" Field," Network Working Group, Feb. 2009, 9 pages.

(Continued)

*Primary Examiner* — Melvin H Pollack
(74) *Attorney, Agent, or Firm* — Slater Matsil, LLP

(57) ABSTRACT

A method for operating a source node includes receiving a data path validation request command requesting validation of a path associated with a traffic flow identified in the data path validation request command, and determining a first hop sequence in accordance with the path being validated, wherein the first hop sequence is identical to a second hop sequence associated with a non-validation request packet associated with the path being validated. The method also includes generating, by the source node, a validation request packet in accordance with the data path validation request command, the validation request packet comprises route information associated with the first hop sequence, an alert flag set to a specified value, and a path validation header specifying processing performed by nodes receiving the validation request packet, and transmitting, by the source node, the validation request packet in accordance with the route information.

34 Claims, 11 Drawing Sheets

(56) References Cited

U.S. PATENT DOCUMENTS

| | | | | |
|---|---|---|---|---|
| 8,549,133 | B2* | 10/2013 | Vaver | H04L 12/2602 709/224 |
| 8,549,405 | B2* | 10/2013 | Bugenhagen | H04L 41/0896 370/229 |
| 8,707,030 | B2* | 4/2014 | Engberg | H04L 9/3268 713/157 |
| 8,798,077 | B2* | 8/2014 | Mehra | H04L 45/24 370/254 |
| 8,811,149 | B2* | 8/2014 | Yabusaki | H04L 45/02 370/216 |
| 8,879,384 | B2* | 11/2014 | Venkataraman | H04L 12/1877 370/228 |
| 8,953,432 | B2* | 2/2015 | Ansari | H04L 45/02 370/216 |
| 9,225,635 | B2* | 12/2015 | Kumbhare | H04L 45/56 |
| 9,236,953 | B2* | 1/2016 | Chhillar | H04B 10/70 |
| 9,246,795 | B2* | 1/2016 | Madaiah | H04L 12/437 |
| 9,246,838 | B1* | 1/2016 | Shen | H04L 47/724 |
| 2013/0185428 | A1* | 7/2013 | Houghton | H04L 69/40 709/225 |
| 2015/0222510 | A1* | 8/2015 | Vaidya | H04L 43/10 370/242 |
| 2015/0350906 | A1* | 12/2015 | Patil | H04W 12/06 713/168 |
| 2016/0006837 | A1* | 1/2016 | Reynolds | H04W 84/18 709/203 |
| 2016/0043797 | A1* | 2/2016 | Sareen | H04B 10/038 398/5 |
| 2016/0127192 | A1* | 5/2016 | Bryant | H04L 41/12 709/224 |

OTHER PUBLICATIONS

Bahadur, N., et al., "Mechanism for Performing Label Switched Path Ping (LPS Ping) over MPLS Tunnels," Internet Engineering Task Force (IETF), Nov. 2011, 19 pages.

Bonica, R., et al., "ICMP Extensions for Multiprotocol Label Switching," Network Working Group, Aug. 2007, 7 pages.

Chen, M., et al., "Label Switched Path (LSP) Ping for Pseudowire Forwarding Equivalence Classes (FECs) Advertised over IPv6," Internet Engineering Task Force (IETF), Jan. 2013, 7 pages.

Gray, E., et al., "MPLS On-Demand Connectivity Verification and Route Tracing," Internet Engineering Task Force (IETF), Nov. 2011, 19 pages.

Kompella, K., et al., "Detecting Multi-Protocol Label Switched (MPLS) Data Plane Failures," Network Working Group, Feb. 2006, 41 pages.

Malkin, G., "Traceroute Using an IP Option," Networking Working Group, Jan. 1993, 6 pages.

Pignataro, C., et al., "Formally Deprecating Some IPv4 Options," Internet Engineering Task Force (IETF), Nov. 2012, 5 pages.

Saxena, S., et al., "Detecting Data-Plane Failures in Point-to-Multipoint MPLS—Extensions to LSP Ping," Internet Engineering Task Force (IETF), Nov. 2011, 25 pages.

* cited by examiner

SYSTEM AND METHOD FOR DATA PATH VALIDATION AND VERIFICATION

TECHNICAL FIELD

The present disclosure relates generally to digital communications, and more particularly to a system and method for data path validation and verification.

BACKGROUND

In general, a routing path that is reliable may become unreliable or even unavailable at one point. Data path validation and verification is a crucial stage in network operations to help ensure the proper operation of the communications system.

SUMMARY OF THE DISCLOSURE

Example embodiments of the present disclosure which provide a system and method for data path validation and verification.

In accordance with an example embodiment of the present disclosure, a method for operating a source node is provided. The method includes receiving, by the source node, a data path validation request command requesting validation of a path associated with a traffic flow identified in the data path validation request command, and determining, by the source node, a first hop sequence in accordance with the path being validated, wherein the first hop sequence is identical to a second hop sequence associated with a non-validation request packet associated with the path being validated. The method also includes generating, by the source node, a validation request packet in accordance with the data path validation request command, the validation request packet comprises route information associated with the first hop sequence, an alert flag set to a specified value, and a path validation header specifying processing performed by nodes receiving the validation request packet, and transmitting, by the source node, the validation request packet in accordance with the route information.

In accordance with another example embodiment of the present disclosure, a method for operating a node is provided. The method includes receiving, by the node, a validation request packet comprising an alert flag set to a specified value, a hop sequence for the validation request packet, a hop index specifying a current hop in the hop sequence, a hop count of hops in the hop sequence, and a path validation header specifying processing performed by nodes receiving the validation request packet, and performing, by the node, processing to produce a result in accordance with the path validation header.

In accordance with another example embodiment of the present disclosure, a source node is provided. The source node includes a receiver, a processor operatively coupled to the receiver, and a transmitter operatively coupled to the processor. The receiver receives a data path validation request command requesting validation of a path associated with a traffic flow identified in the data path validation request command. The processor determines a first hop sequence in accordance with the path being validated, wherein the first hop sequence is identical to a second hop sequence associated with a non-validation request packet associated with the path being validated, and generates a validation request packet in accordance with the data path validation request command, the validation request packet comprises route information associated with the first hop sequence, an alert flag set to a specified value, and a path validation header specifying processing performed by nodes receiving the validation request packet. The transmitter transmits the validation request packet in accordance with the route information.

In accordance with another example embodiment of the present disclosure, a node is provided. The node includes a receiver, and a processor operatively coupled to the receiver. The receiver receives a validation request packet comprising an alert flag set to a specified value, a hop sequence for the validation request packet, and a path validation header specifying processing performed by nodes receiving the validation request packet. The processor performs a procedure to produce a result in accordance with the path validation header.

One advantage of an embodiment is that data path validation and verification is performed for an intended path. Furthermore, data path symmetry may also be validated.

A further advantage of an embodiment is that different types of actions may be performed and resulting information recorded for subsequent processing by requesting node.

Yet another advantage of an embodiment is that a single request and corresponding reply can obtain all required information for data path validation and verification.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to data path validation and verification. For example, a source node receives a data path validation request command requesting validation of a path associated with a traffic flow identified in the data path validation request command, and determines a first hop sequence in accordance with the path being validated, wherein the first hop sequence is identical to a second hop sequence associated with a non-validation request packet associated with the path being validated. The source node also generates a validation request packet in accordance with the data path validation request command, the validation request packet comprises route information associated with the first hop sequence, an alert flag set to a specified value, and a path validation header specifying processing performed by nodes receiving the validation request packet, and transmits the validation request packet in accordance with the route information.

The present disclosure will be described with respect to example embodiments in a specific context, namely software defined networks (SDNs) that use index-based source routing to route packets between source and destination nodes. The disclosure may be applied to standards compliant communications systems and non-standards compliant communications systems, which use index-based source routing to route packets between source and destination nodes.

Figure 1:
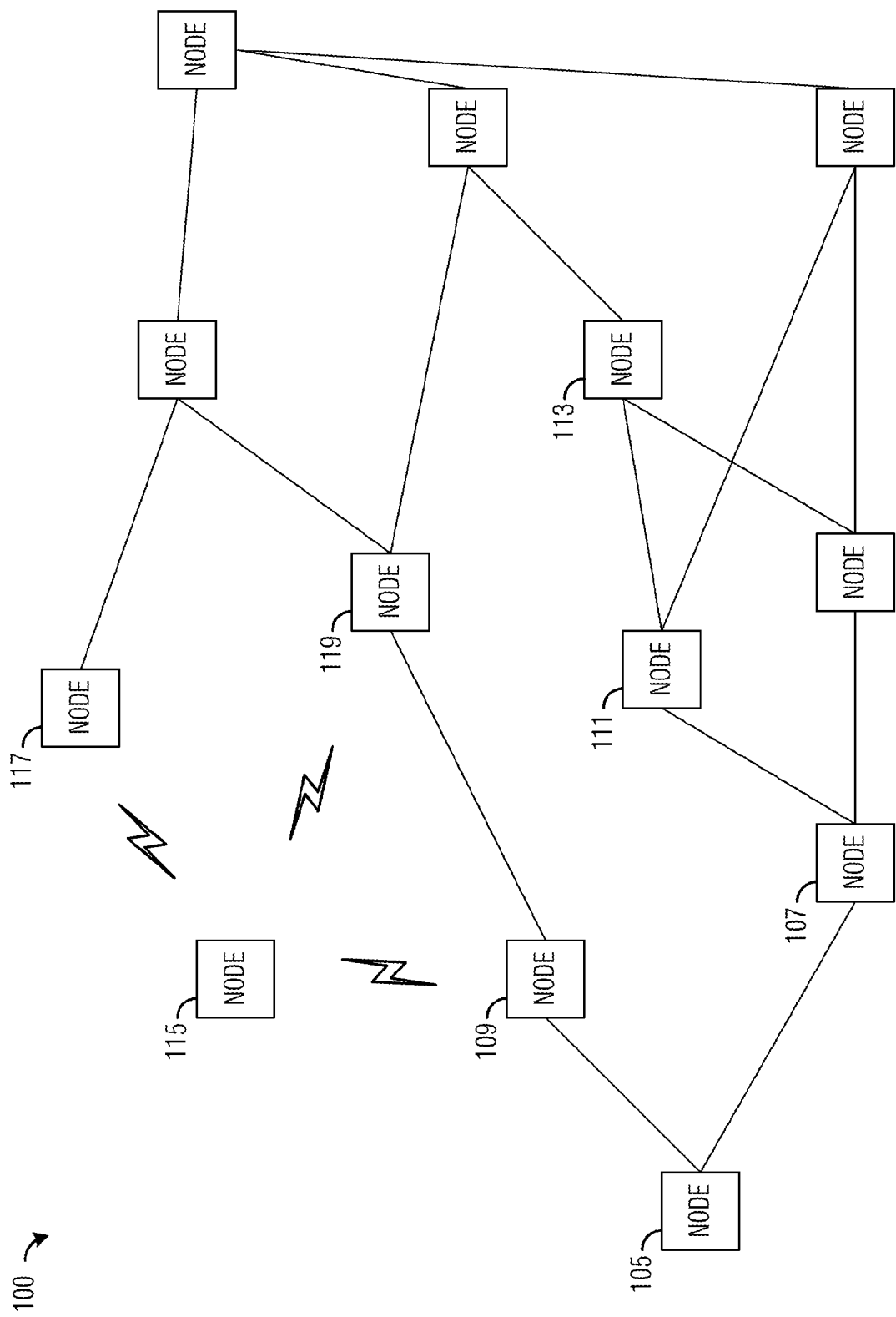
FIG. 1 illustrates an example communications system according to example embodiments described herein.

FIG. 1 illustrates an example communications system 100. Communications system 100 may include a plurality of nodes, such as node 105, node 107, node 109, node 111, node 113, node 115, node 117, node 119, and the like. The nodes in communications system 100 may have wireline and/or wireless interconnections. As an illustrative example, node 105 may be connected to node 107 and node 109 with wireline interconnections, while node 109 may be connected to node 115 with a wireless interconnection. Some nodes may have both wireline and wireless interconnections. As an illustrative example, node 119 is connected wirelessly to node 115, while a wireline connects node 109 to node 119. While it is understood that communications systems may employ a large number nodes, only a relatively small number of nodes are illustrated for simplicity.

In index-based source routing, a source node of a packet generates the routing for the packet. In other words, the source node of the packet specifies the data path for the packet. The data path for the packet may be specified by specifying a sequence of links (or equivalently hops) to be taken by the packet as it moves from the source node to the destination node. As an illustrative example, a first hop may specify a link from the source node to a first intermediate node, a second hop may specify a link from the first intermediate node to a second intermediate node, and so on, until an N-th hop may specify a link from an N-th intermediate node to the destination node.

Figure 2:
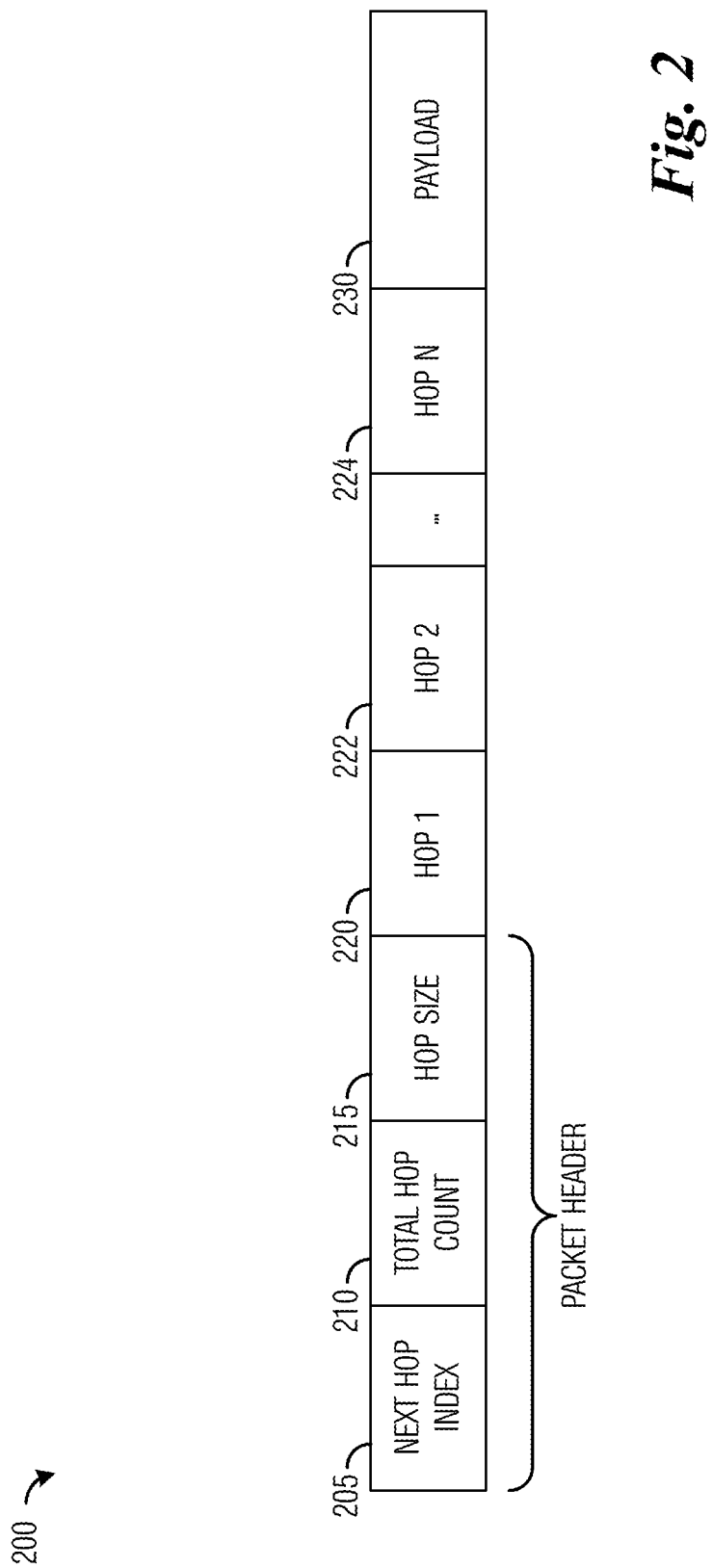
FIG. 2 illustrates an example packet used in an index-based source routed communications system according to example embodiments described herein.

FIG. 2 illustrates an example packet 200 used in an index-based source routed communications system. Packet 200 includes a packet header comprising a next hop index field 205, a total hop count field 210, and a hop size field 215. Packet 200 also includes N hop fields (such as hop 1 field 220, hop 2 field 222, and hop N field 224), and a payload field 230. Next hop index field 205 may store a value that serves as a pointer to a next hop for packet 200. Total hop count field 210 may store a value that indicates a total number of hops for packet 200. Hop size field 215 may store a value that indicates a size of each individual hop. Hop fields (such as hop 1 field 220, hop 2 field 222, and hop N field 224) may store values that indicate the link (or hop) that packet 200 is to take as it leaves a node. Payload field 230 may store data and/or control information of packet 200.

Figure 3:
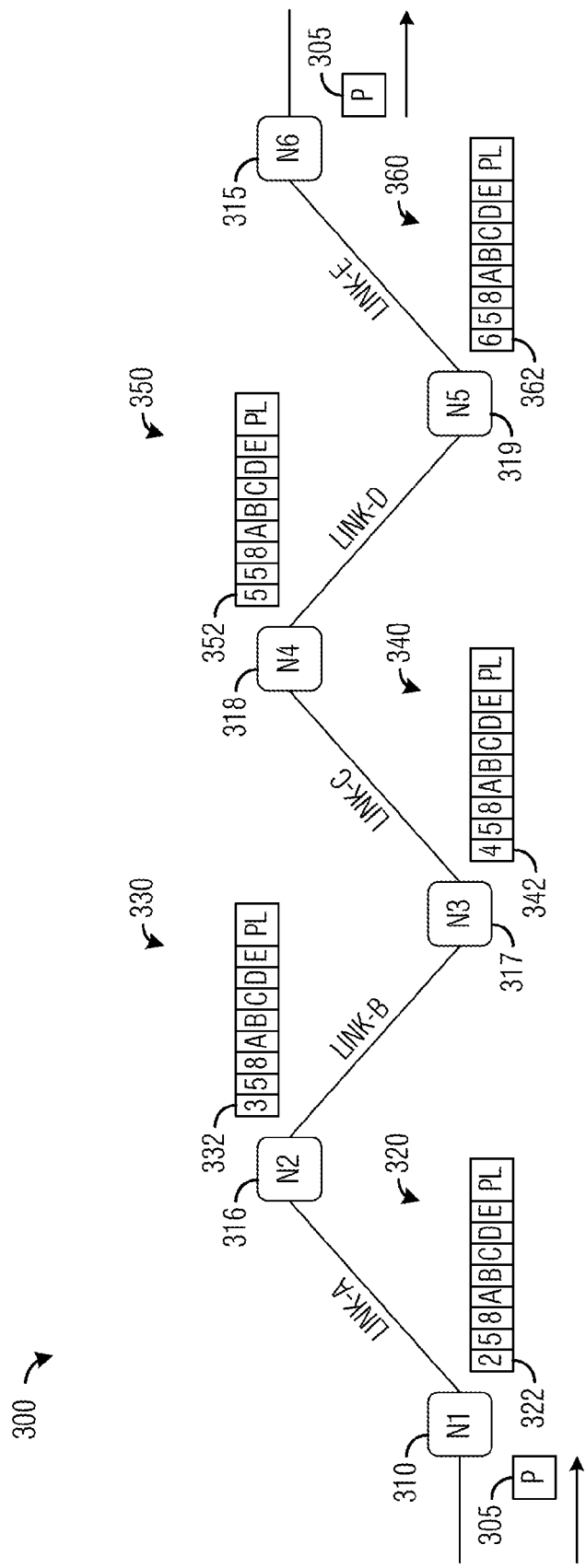
FIG. 3 illustrates an example communications system, highlighting a path of a packet from source node to destination node according to example embodiments described herein.

FIG. 3 illustrates a communications system 300, highlighting a path of a packet from source node to destination node. FIG. 3 illustrates a source routed network portion of communications system 300. Communications system 300 may include other types of networks, including an Internet Protocol (IP) network. A packet 305 arrives at the source routed network and is sent from source node 310 to destination node 315. At destination node 315, packet 305 may exit the source routed network. Source node 310 and destination node 315 may be considered as the source and destination nodes of packet 305 within the source routed network. Packet 305 may have its own source and destination nodes and source node 310 and destination node 315 may be source and destination nodes of packet 305 within the source routed network portion of communications system 300. Alternatively, packet 305 may actually originate at source node 310 and end at destination node 315. In such a situation, there may not be arrows at source node 310 and destination node 315 indicating the entrance and exit of packet 305.

Since index-based source routing is used, source node 310 specifies the data path for packet 305, which includes intermediate node 316, intermediate node 317, intermediate node 318, and intermediate node 319, for example, before ending at destination node 315. As an illustrative example, source node 310 may utilize a path determining engine or table to determine the data path (or path sequence) to destination node 315. In a SDN network, a path determining engine or table may provide the path information to a SDN controller and the SDN controller may communicate the path information to the source node.

Highlight 320 provides a detailed view of packet 305 as it leaves source node 310 and heads towards intermediate node 316. Next hop index field 322 of highlight 320 of packet 305 may hold a value that indicates the hop of packet 305 at intermediate node 316. Highlight 330 provides a detailed view of packet 305 as it leaves intermediate node 316. Next hop index field 332 of highlight 330 of packet 305 may hold a value that indicates the hop of packet 305 at intermediate node 317. Highlight 340 provides a detailed view of packet 305 as it leaves intermediate node 317. Next hop index field 342 of highlight 340 of packet 305 may hold a value that indicates the hop of packet 305 at intermediate node 318. Highlight 350 provides a detailed view of packet 305 as it leaves intermediate node 318. Next hop index field 352 of highlight 350 of packet 305 may hold a value that indicates the hop of packet 305 at intermediate node 319. Highlight 360 provides a detailed view of packet 305 as it leaves intermediate node 319. Next hop index field 362 of highlight 360 of packet 305 may hold a value that is greater than the number of hops in the data path from source node 310 to destination node 315. Destination node 315, upon receiving packet 305, may detect that hop index 362 has the value of 6, which is greater than the number of hops. Hence, destination node 315 is able to determine that it is the destination for packet 305 (at least in the source routed network portion of communications system 300).

As discussed previously, it may be advantageous to verify and/or validate a data path between a source node and a destination node. In general, data path verification and/or validation is performed for packet flows. It may also be advantageous to verify the symmetry of a data path (i.e., hops in both a forward path (from source to destination) and a reverse path (from destination to source) traverse the same set of nodes but in reversed order) between the source node and the destination node.

According to an example embodiment, an alert flag or indicator is added to a packet used for satisfying path validation requests. The alert flag or indicator may be added to a packet header portion of the packet. The alert flag or indicator may be added to a hop size field of the packet header portion of the packet. Alternatively, the alert flag or indicator may be added to any one of the fields of the packet header portion of the packet. Alternatively, the alert flag or indicator may be added as a separate field of the packet header portion of the packet. Those skilled in the art will appreciate that it is possible, in some circumstances, to set the alert flag on a data packet being sent through the network so that the packet can also be used to address path validation requests. In this case, the determination of the routing is done by ensuring the selection of the correct data packet. Factors such as data packet length may come into play with the selection of the data packet. Nodes receiving the dual purpose packet may need to modify the manner in which they handle the packet, and issues such as delay may also need to be addressed.

According to an example embodiment, the alert flag or indicator is a two-valued (binary) indicator with a first value and a second value, where the first value (or the second value) indicating that the packet is used for satisfying path validation requests and the second value (or the first value) indicating that the packet is not used for satisfying path validation requests. According to another example embodiment, the alert flag or indicator is a multi-bit indicator that can take on more than 2 values. In such a situation, the multi-bit alert flag or indicator may be used in conjunction with a path validation header (discussed in detail below) to refine the operation that nodes receiving a packet with the multi-bit alert flag or indicator perform. Furthermore, the multi-bit alert flag or indicator when used in conjunction with the path validation header may even specify a node type that performs the operation, or which node types perform which operation, and the like. As an illustrative example, a plurality of bits may be allocated for use as a multi-bit indicator. One of the bits in the plurality of bits, e.g., the first bit, may be used as a simple alert to let nodes know that the nodes are to examine the packet. Other bits in the plurality of bits may be used to indicate a required operation(s). It is noted that the bit used as the alert may always be set to the on (or 1) value for validation packets, while the other bits may be set to the on (or 1) value to indicate the required operation(s). As yet another illustrative example, consider an example packet that includes a multi-bit alert flag that is 8 bits long: B1 B2 B3 B4 B5 B6 B7, with B1 serving as the alert flag and B6 indicating that path symmetry is required. Therefore, the bits may be set to 10000100. Intermediate nodes may ignore B6, but when the packet arrives at the destination node, it examines B6 and since it is set, the destination node simply reverses the hop sequence instead of generating its own reverse path. Nodes may examine the Path Validation (PV) header for the requested operation. As another illustrative example, B5 may indicate a No Operation (No-op) to all nodes. Such a situation may cover a scenario when the nodes in the reverse path do not need to perform any operation.

According to an example embodiment, a path validation header is added to a packet used for satisfying path validation requests. The path validation header may be added to a non-packet header portion of the packet. The path validation header may follow a packet header portion of the packet. The path validation header may lead or follow a payload portion of the packet. The path validation header may include an indication of an information type(s) being requested by the validation request. The path validation header may include an indication of a procedure(s), such as an action type(s) and/or operations that nodes in the data path of the packet are to perform. The path validation header may include instructions that nodes in the data path of the packet are to perform.

Figure 4:
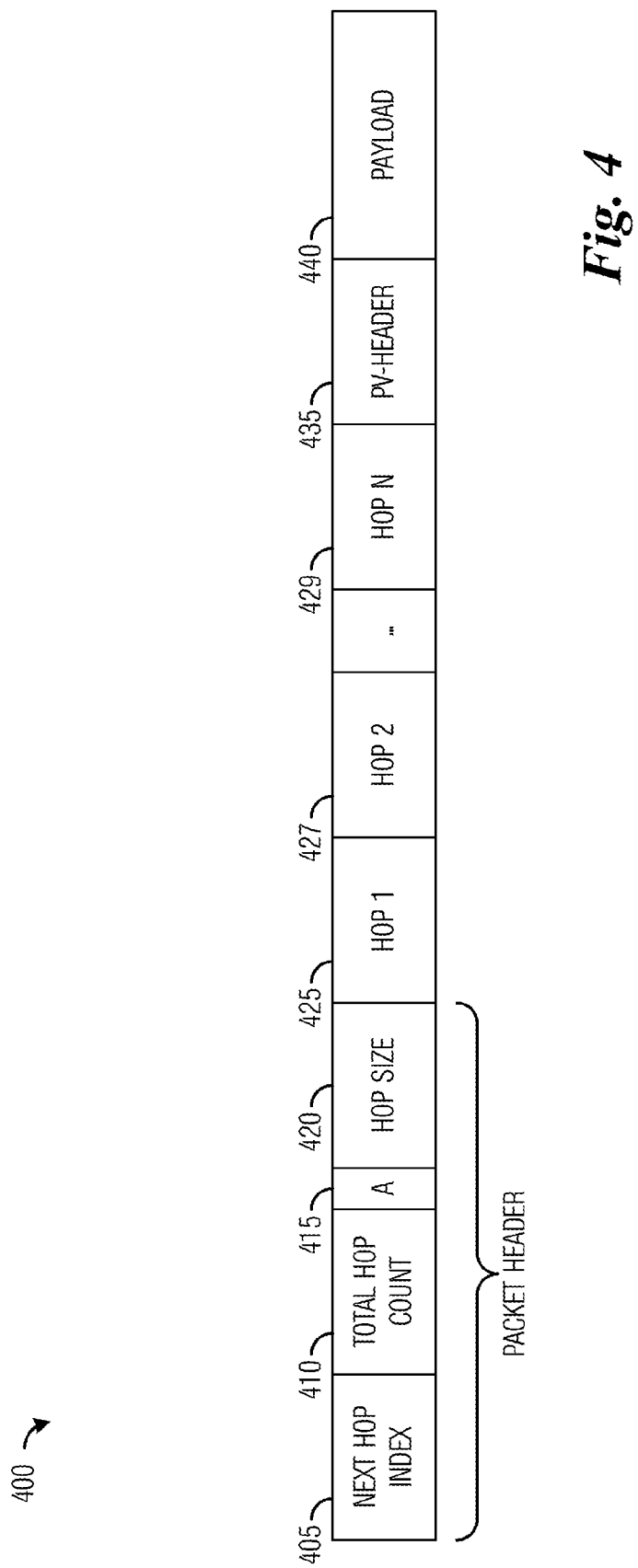
FIG. 4 illustrates an example validation request packet according to example embodiments described herein.

FIG. 4 illustrates an example validation request packet 400. Validation request packet 400 includes a packet header comprising a next hop index field 405, a total hop count field 410, an alert flag 415, and a hop size field 420. Collectively, next hope index field 405, total hop count 410, alert flag 415, and hop size field 420 form a packet header of validation request packet 400. It is noted that the packet header is similar in format to the packet header of packet 200 of FIG. 2. Validation request packet 400 also includes N hop fields (such as hop 1 field 425, hop 2 field 427, and hop N field 429), and a path validation header (PV-header) field 435. The packet 400 may also include a payload field in some embodiments. It is noted that the N hop fields contain the same hops as an ordinary packet of a traffic flow being validated by a data path validation request command. Next hop index field 405 may store a value that serves as a pointer to a next hop for packet 400. Total hop count field 410 may store a value that indicates a total number of hops for packet 400. Alert flag 415 may serve as an indicator that packet 400 is a validation request packet. Hop size field 420 may store a value that indicates a size of each individual hop. As shown in FIG. 4, alert flag 415 is part of hop size field 420. Hop fields (such as hop 1 field 425, hop 2 field 427, and hop N field 429) may store values that indicate the link (or hop) that packet 400 is to take as it leaves a node. PV-header 435 may include an indication of an information type(s), instructions, operations, and the like, being requested by packet 400.

PV-header 435 may have a default processing that a node receiving packet 400 is to perform, where if PV-header 435 does not explicitly specify processing, nodes receiving packet 400 will perform the default processing. In such a situation, PV-header 435 may be said to be implicitly specifying the default processing. As an illustrative example, a no operation (NOOP) may be a default processing that a node is to perform if PV-header 435 does not explicitly specify a processing. PV-header 435 may specify identical processing for all nodes that receive packet 400. In other words, each node performs the same processing. PV-header 435 may specify different processing for different nodes that receive packet 400. In other words, different nodes may perform different processing, depending on what is specified in PV-header 435.

As noted above, packet 400 may also include a payload field 440 that may be used to store data and/or control information of packet 400. Payload field 440 may also store results of operations performed by nodes as they receive packet 400 and perform procedures(s), such as instruction(s), action type(s), operation(s), and the like, as specified in PV-header field 435. In some instances, packet 400 may not have a payload field 440. As an illustrative example, when nodes receiving packet 400 are to perform NOOPs, payload field 440 may not be needed. Packet 400 may be used as a continuity check, i.e., to check that the path specified in packet 400 is up and supporting traffic, for example. In other words, packet 400 may be injected into the source routed network and when a response is received, the path specified in packet 400 is considered to be up and supporting traffic.

According to an example embodiment, the alert flag is a two-valued indicator. The alert flag may be implemented using as a 1 bit indicator in the packet header. Although shown in FIG. 4 as a part of hop size field 420 of the packet header, the alert flag may be a part of any of the other fields of the packet header. Alternatively, the alert flag may be a separate field of the packet header. Therefore, the discussion and illustration of the alert flag being a portion of hop size field should not be construed as being limiting to either the scope or the spirit of the example embodiments.

Figure 5:
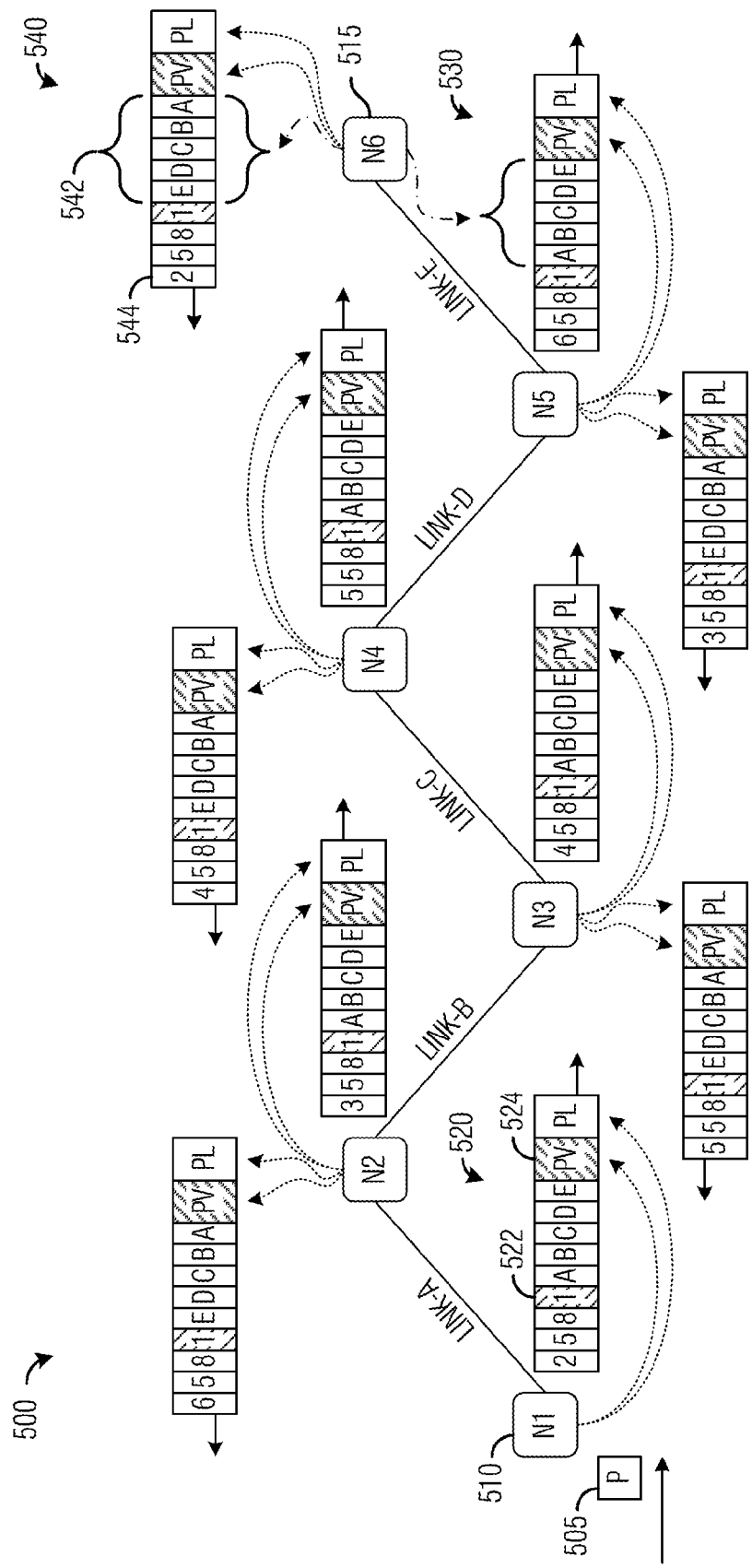
FIG. 5 illustrates a communications system, highlighting a path of a validation request packet according to example embodiments described herein.

FIG. 5 illustrates a communications system 500, highlighting a path of a validation request packet. A validation request packet 505 may be injected into communications system 500 by source node 510 in response to a received data path validation request command specifying a particular traffic flow to be validated and/or verified. From the traffic flow specified in the data path validation request command, a hop sequence is determined for validation request packet 505, which is identical to a hop sequence for packets of the traffic flow. Validation request packet 505 may be destined for destination node 515. Highlight 520 illustrates a detailed view of validation request packet 505 as it is being injected into communications system 500 by source node 510. Highlight 520 may include fields that are typical of an index-based source routed packet (such as the illustrative structure of packet 200 of FIG. 2) with the addition of an alert flag 522 and a PV-header 524.

As discussed previously, as validation request packet 505 traverses nodes on its way to destination node, the nodes that it traverses detects that alert flag 522 is set. Upon detection that alert flag 522 is set, the nodes examine PV-header 524 to determine procedure(s), such as action type(s), instruction(s), operation(s), and the like, that they are to perform. Upon completion of the procedures(s), e.g., action type(s), instruction(s), operation(s), and the like, the nodes store results in a payload of validation request packet 505.

Destination node 515, upon receipt of validation request packet 505 (shown in detail as highlight 530), also performs the procedure(s), e.g., action type(s), instruction(s), operation(s), and the like, and stored the results in the payload. Destination node 515 also knows that it is the destination of validation request packet 505, generates a reverse path for validation request packet 505 (an example reverse path is illustrated in boxes 542 of highlight 540), and resets the value stored in next hop index field 544. According to an example embodiment, the reverse path is generated by reversing the sequence of links (hops) stored in validation request packet 505. According to an example embodiment, destination node 515 may access a path determining engine (or table) to determine the reverse path for validation request packet 505. In such a situation, the reverse path may be different from the reverse of the sequence of hops stored in validation request packet 505.

For clarity purposes, the validation request packet that corresponds to validation request packet 505 may be referred to as a validation response packet. The validation response packet may be identical to validation request packet 505 as received by destination 515 with exception of the newly generated reverse path and a change in the next hop index (and potentially some changes in total hop count and hop size fields if the reverse path is not identical to the sequence of hops included in validation request packet 505). Destination node 515 may send the validation response packet (shown as highlight 540) back to source node 505. Nodes that are traversed by the validation response packet examine the PV-header to determine procedure(s), e.g., action type(s), instruction(s), operation(s), and the like, they are to perform. Upon completion of the procedure(s), e.g., action type(s), instruction(s), operation(s), and the like, the nodes store results in a payload of the validation response packet. According to an example embodiment, destination node 515 includes an indication in the validation response packet to indicate that the intermediate nodes are to take no action. In such a situation, the intermediate nodes receiving the validation response packet simply forward the validation response packet in accordance to the routing information included therein.

Figure 6A:
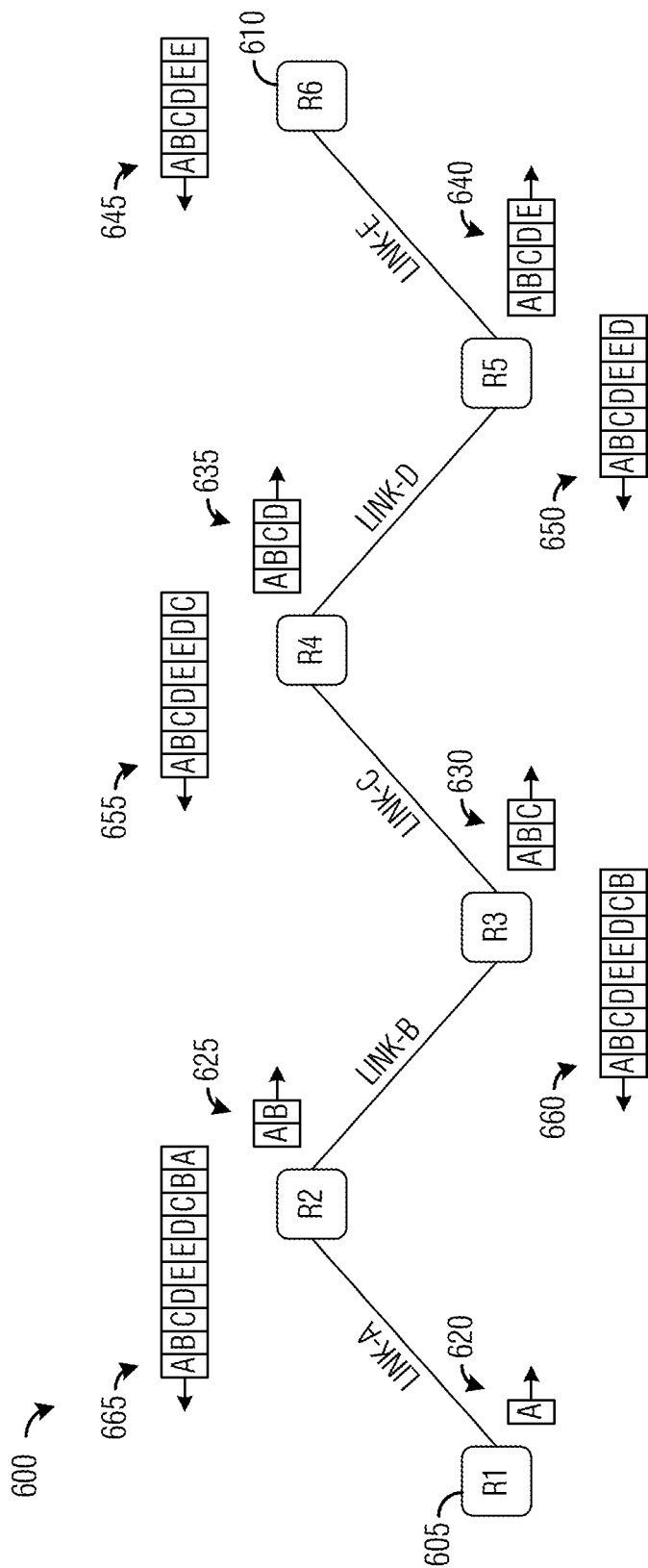
FIG. 6a illustrates a communications system, highlighting a payload of a validation request packet where a reverse path and a forward path are identical as the validation request packet traverses through the communications system according to example embodiments described herein.

FIG. 6a illustrates a communications system 600, highlighting a payload of a validation request packet where a reverse path and a forward path are identical (but reversed) as the validation request packet traverses through communications system 600. A validation request packet is injected into communications system 600 by source node 605 and is destined for destination node 610. As the validation request packet is injected into communications system 600, source node 605 adds the result of the completion of the procedure(s), e.g., action type(s), instruction(s), operation(s), and the like (as specified in a PV-header in the validation request packet) into the payload. As an illustrative example, consider a situation where the procedure(s), e.g., action type(s), instruction(s), operation(s), and the like, is an instruction for the node to insert the link used to transmit the validation request packet in the payload (shown as block 620). As the validation request packet heads towards destination node 610, each node inserts the link used to transmit the validation request packet in the payload (shown as block 625, block 630, block 635, and block 640). Block 645, block 650, block 655, block 660, and block 665 show the content of the payload of the validation request packet as it makes its return to source node 605. Since the reverse path and the forward path of the validation request packet are identical (but reversed), the payload of the validation request packet includes a symmetric list of links traversed by the validation request packet.

Figure 6B:
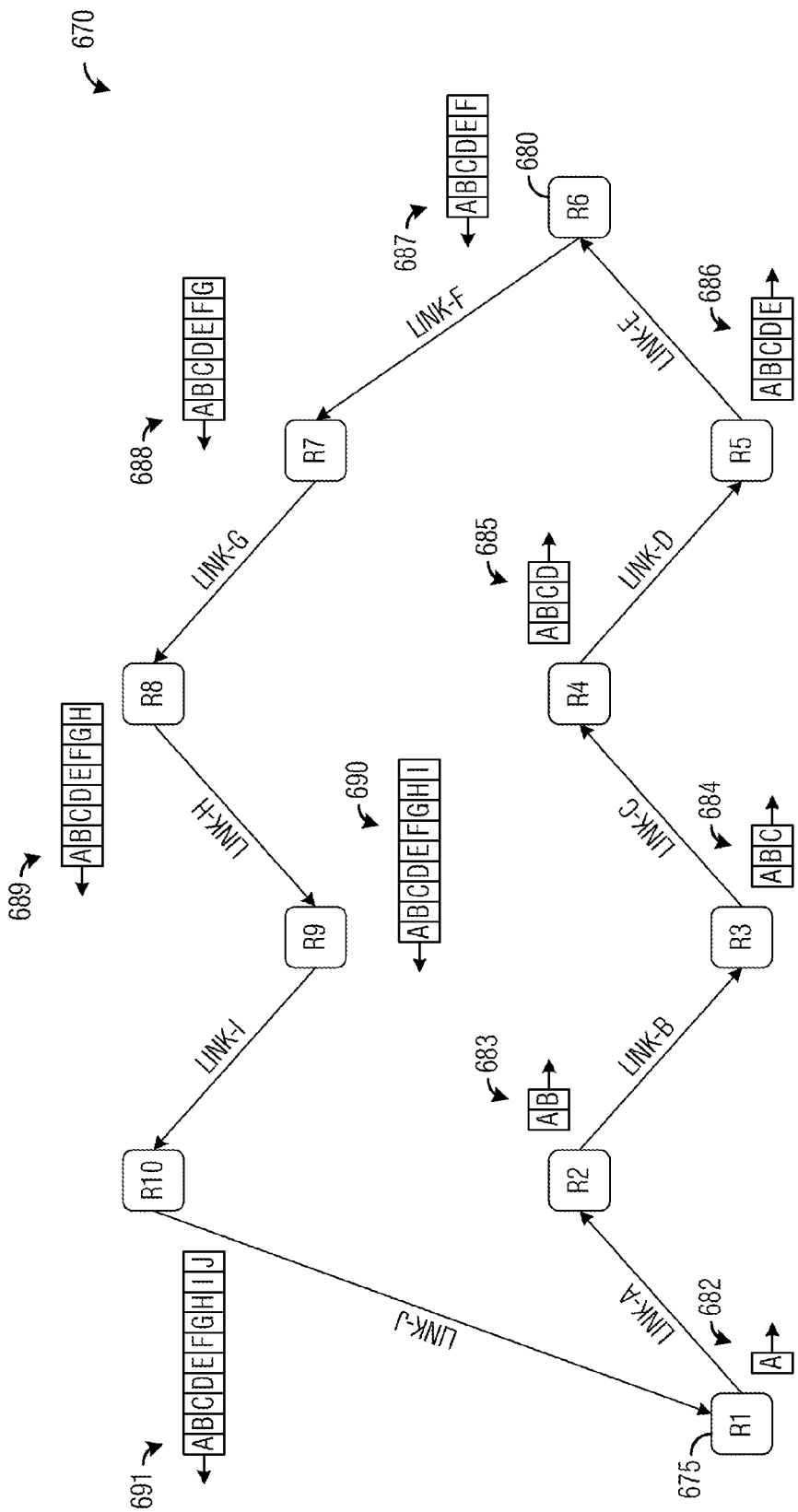
FIG. 6b illustrates a communications system, highlighting a payload of a validation request packet where a reverse path is different from a forward path as the validation request packet traverses through the communications system according to example embodiment described herein.

FIG. 6b illustrates a communications system 670, highlighting a payload of a validation request packet where a reverse path is different from a forward path as the validation request packet traverses through communications system 670. A validation request packet is injected into communications system 670 by source node 675 and is destined for destination node 680. As the validation request packet is injected into communications system 670, source node 675 adds the result of the completion of the procedure(s), e.g., action type(s), instruction(s), operation(s), and the like (as specified in a PV-header in the validation request packet) into the payload. As an illustrative example, consider a situation where the procedure(s), e.g., action type(s), instruction(s), operation(s), and the like, is an instruction for the node to insert the link used to transmit the validation request packet in the payload (shown as block 682). As the validation request packet heads towards destination node 680, each node inserts the link used to transmit the validation request packet in the payload (shown as block 683, block 684, block 685, and block 686). Destination node 680 may not rely on the hop sequence as provided by the validation request packet. Instead, destination node 680 may consult a controller, a route look-up table, and the like, for a new set of hops for a return path back to source node 675. Block 687, block 688, block 689, block 690, and block 691 show the content of the payload of the validation request packet as it makes its return to source node 675. Since the reverse path and the forward path of the validation request packet are different, the payload of the validation request packet includes an asymmetric list of links traversed by the validation request packet.

Figure 7:
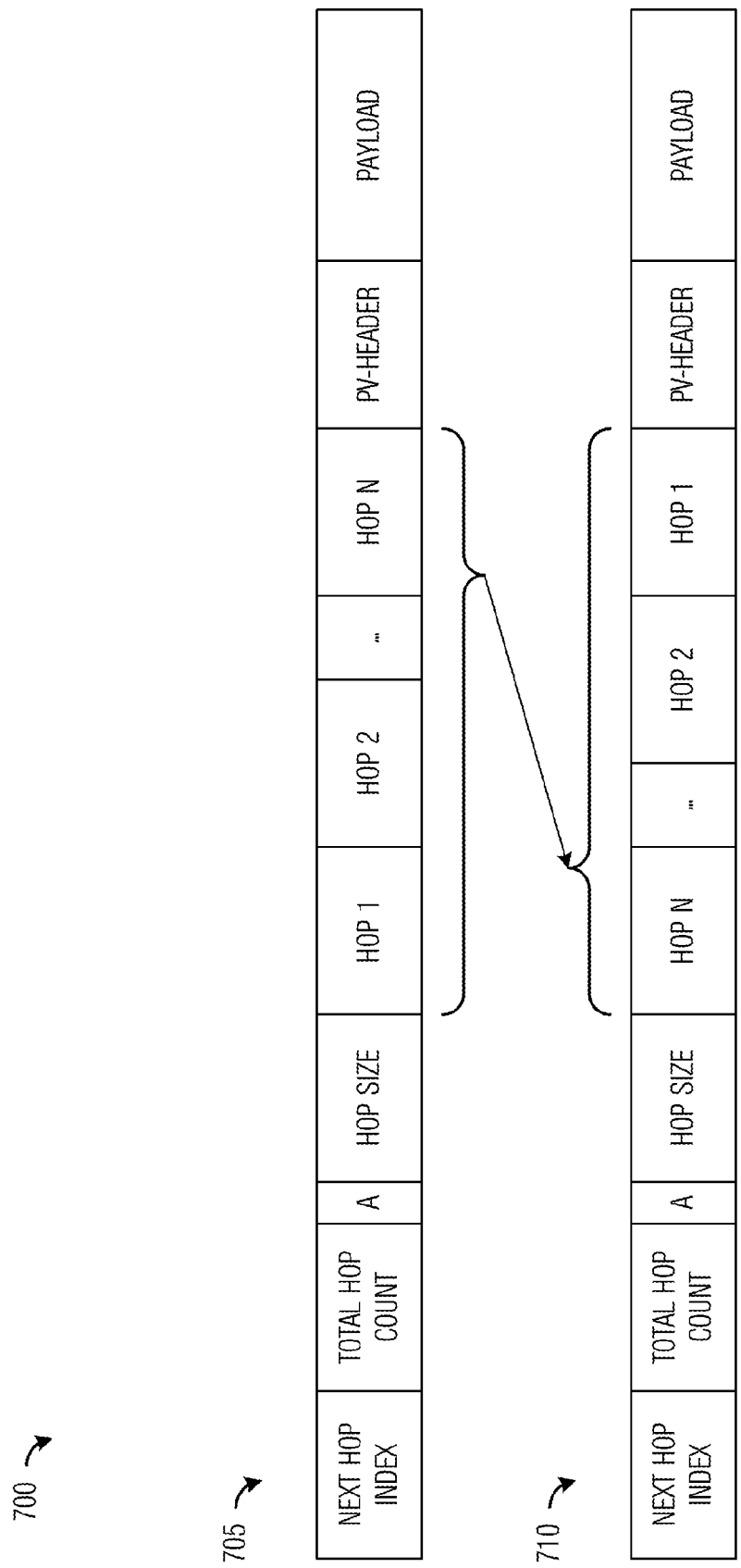
FIG. 7 illustrates example validation request packets in the case of symmetry request according to example embodiments described herein.

FIG. 7 illustrates example validation request packets in the case of a symmetry request. The validation request packets shown in FIG. 7 represent two stages of a single validation request packet. A validation request packet 705 represents a first stage of the validation request packet as it traverses nodes on its way from a source node to a destination node and a validation response packet 710 represents a second stage of the validation request packet as it traverses nodes on its way back to the source node from the destination node. Validation response packet 710 may have a similar appearance to validation request packet 705 with exception of information related to the reverse path in the packet header and the hop fields.

Figure 8:
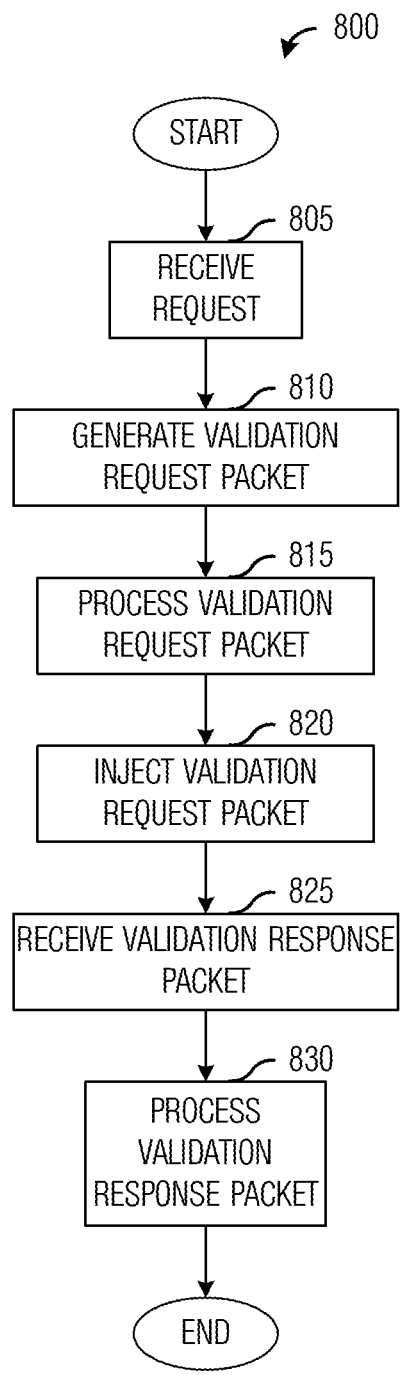
FIG. 8 illustrates a flow diagram of example operations occurring in a source node that is participating in data path validation and verification according to example embodiments described herein.

FIG. 8 illustrates a flow diagram of example operations 800 occurring in a source node that is participating in data path validation and verification. Operations 800 may be indicative of operations occurring in a source node, such as source node 510, source node 605, and the like, as the source node participates in data path validation and verification.

Operations 800 may begin with the source node receiving a data path validation request (block 805). The source node may receive the data path validation request command from an operator that is using a command line interface of the source node or a management console of a software defined network controller to issue a data path validation request command. The data path validation request command may be for the validation of a data path associated with a traffic flow entering the source node for a source routing domain. The data path validation request command may specify information (i.e., traffic flow information) about the traffic flow, which helps to identify the traffic flow. The traffic flow information may be in the form of an identifier for the traffic flow, for example.

As another illustrative example of traffic flow information, consider a situation wherein an index-based source routed region is surrounded by a regular IP network. In such a situation, a traffic flow may include packets with destination address x.y.z.w. When IP packets with the destination address (x.y.z.w) encounters an initial edge of the index-based source routed network, a corresponding switch may insert a source route header and hop sequence based on information it receives from a SDN controller and then sends the packets on their way towards a terminating edge of the index-based source routed network. At the terminating edge, a terminating source routing node may eliminate all source routing headers and hop sequences, thereby allowing normal IP processing to perform any remaining routing to get the packets to the destination address. Suppose that an operator wishes to verify the path of the packets of the traffic flow in index-based source routed network and ask each node to identify the outgoing link, an example command at the initial edge node may be expressed as:

sourceRouteVerify x.y.z.w action: record outboundLink.
In such an example command, the destination address (x.y.z.w) may be used as traffic flow information to identify the packet flow.

The data path validation request command may also specify procedure(s), e.g., action type(s), instruction(s), operation(s), and the like, that nodes should perform and insert results thereof in a payload of a validation request packet associated with the data path validation request command.

The source node may generate the validation request packet (block 810). The validation request packet may have a format similar to one shown in FIG. 4 or variations thereof discussed previously. Generating the validation request packet may include the source node determining a route and routing information in accordance with the traffic flow information and generating (placing information, for example) in the validation request packet. As an illustrative example, the source node may use a path associated with the traffic flow (as identified by the traffic flow information specified in the data path validation request command) to determine a route and routing information, and insert the routing information (e.g., hop count, hop size, hops, and the like) in the validation request packet. The source node may set the alert flag and include the procedure(s), e.g., action type(s), instruction(s), operation(s), and the like, in the PV-header of the validation request packet.

The source node may process the validation request packet (block 815). In other words, the source node may perform any included procedure(s), such as action type(s), instruction(s), operation(s), and the like, in the PV-header of the validation request packet and insert a result in the payload of the validation request packet. The source node may also update the next hop index of the validation request packet. The source node may inject the validation request packet (block 820). The source node may receive a validation response packet corresponding to the validation request packet (block 825). The validation response packet may be a version of the validation request packet that has been modified by a destination node of the validation request packet, which may include a reverse path for the validation response packet back to the source node (as well as any associated change to routing information), as well as including information included in the payload by nodes traversed by the validation request packet and potentially information included in the payload by nodes traversed by the validation response packet. The source node may process the validation response packet (block 830). Processing of the validation response packet may include processing the payload to analyze the information inserted by the nodes traversed by the validation request packet and/or the validation response packet, verify the data path, verify path symmetry, and the like.

Figure 9:
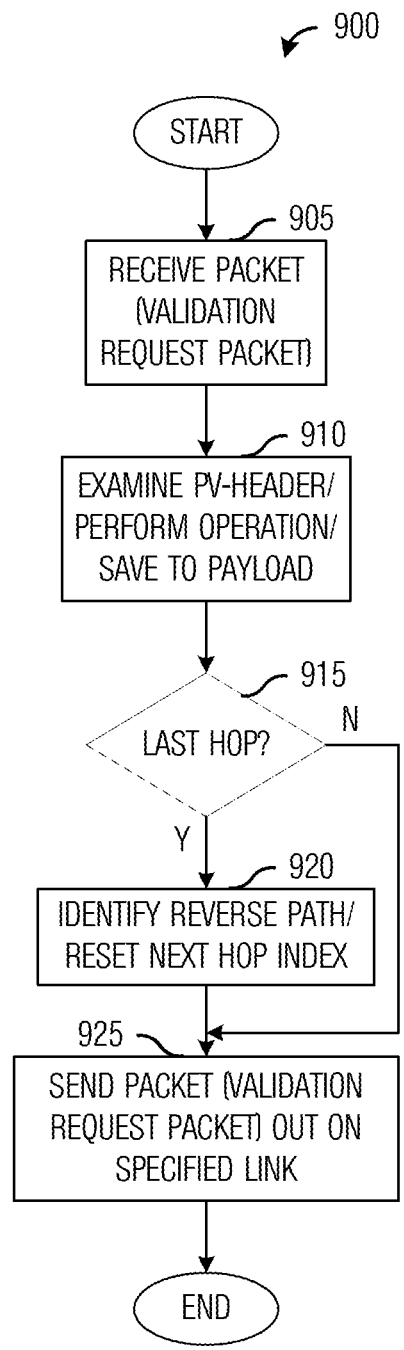
FIG. 9 illustrates a flow diagram of example operations occurring in a node that is processing a packet according to example embodiments described herein.

FIG. 9 illustrates a flow diagram of example operations 900 occurring in a node that is processing a packet. Operations 900 may be indicative of operations occurring in a node, such as an intermediate node, or a destination node, such as destination nodes 515 and 610, as the node processes a packet.

Operations 900 may begin with the node receiving a packet (block 905). The packet may be a validation request packet. As discussed previously, the validation request packet may be indicated by the alert flag being set to a specified value. The node may examine the PV-header of the validation request packet, perform procedure(s), e.g., action type(s), instruction(s), operation(s), and the like, as specified in the PV-header, and save the result(s) to the payload of the validation request packet (block 910).

The node may perform a check to determine if it is the last hop for the packet (block 915). As an illustrative example, the node may check the next hop index in the packet with the hop count value and if the next hop index is greater than the hop count value, the node may determine that it is the last hop for the packet. If the node is the last hop for the packet, the node may identify a reverse path for the validation request packet and reset the next hop index (block 920) and send the validation request packet out on the specified link (block 925). As discussed previously, identifying the reverse path may include reversing the hops stored in the validation request packet or using a path determining engine or table to identify a route from the node back to the source node of the validation request packet. Identifying the reverse path may also include the node generating routing information, such as next hop index, hop count, hop size, hops, and the like, for the reverse path. If the node is not the last hop for the packet, the node may send the packet out on the specified link (block 925).

Figure 10:
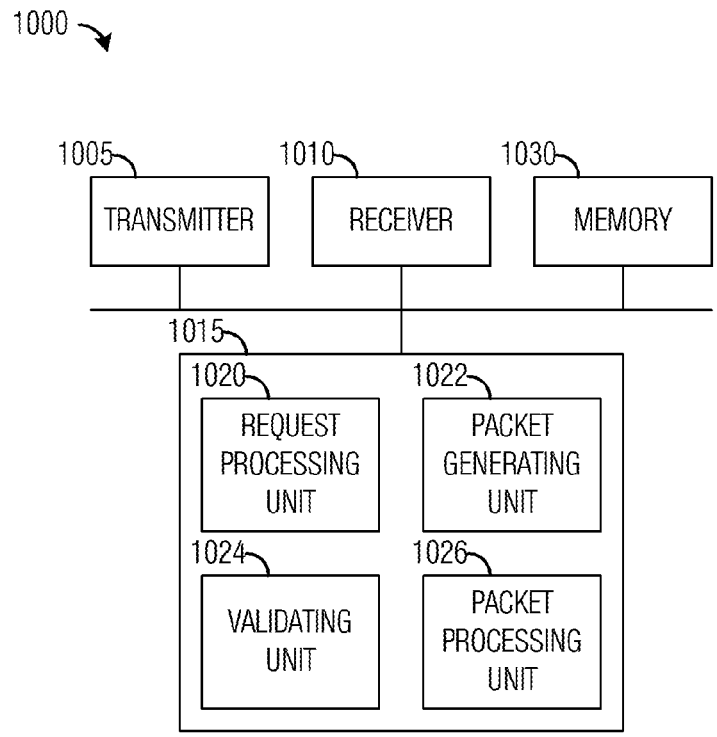
FIG. 10 illustrates an example first communications device according to example embodiments described herein.

FIG. 10 illustrates an example first communications device 1000. Communications device 1000 may be an implementation of a source node. Communications device 1000 may be used to implement various ones of the embodiments discussed herein. As shown in FIG. 10, a transmitter 1005 is configured to transmit packets, validation request packets, and the like. Communications device 1000 also includes a receiver 1010 that is configured to receive packets, validation request packets, and the like.

A request processing unit 1020 is configured to receive a data path validation request. The data path validation request may be from an operator that is using a command line interface of the source node or a management console of a software defined network controller to issue a data path validation request command for a specific traffic flow. Request processing unit 1020 is configured to process the data path validation request. A packet generating unit 1022 is configured to generate a validation request packet from the data path validation request. Packet generating unit 1022 is configured to set an alert flag to a specified value to indicate that the packet is a validation request packet. Packet generating unit 1022 is configured to place procedure(s), e.g., action type(s), instruction(s), operation(s), and the like, in the PV-header. Packet generating unit 1022 is configured to place values in the remainder of the validation request packet, such as hop count, hop index, hops, hop size, payload, and the like. A validating unit 1024 is configured to process a received packet, such as a received validation response packet that corresponds to a validation request packet transmitted by communications device 1000. Validating unit 1024 is configured to process information stored in the payload of the received validation response packet to verify and/or validate the data path, validate data path symmetry, and the like. A packet processing unit 1026 is configured to process validation request packets and validation response packets. Packet processing unit 1026 is configured to examine PV-headers, perform procedure(s), e.g., action type(s), instruction(s), operation(s), and the like, as specified in the PV-header, and save the result(s) to the payload of the packets. Packet processing unit 1026 is configured to update information, such as hop index, and the like, to perform source routing. A memory 1030 is configured to store packets, data path validation requests, validation request packets, received validation request packets, results stored in payloads, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while request processing unit 1020, packet generating unit 1022, validating unit 1024, and packet processing unit 1026 may be software modules executing in a microprocessor (such as processor 1015) or a custom circuit or a custom compiled logic array of a field programmable logic array. Request processing unit 1020, packet generating unit 1022, validating unit 1024, and packet processing unit 1026 may be modules stored in memory 1030.

Figure 11:
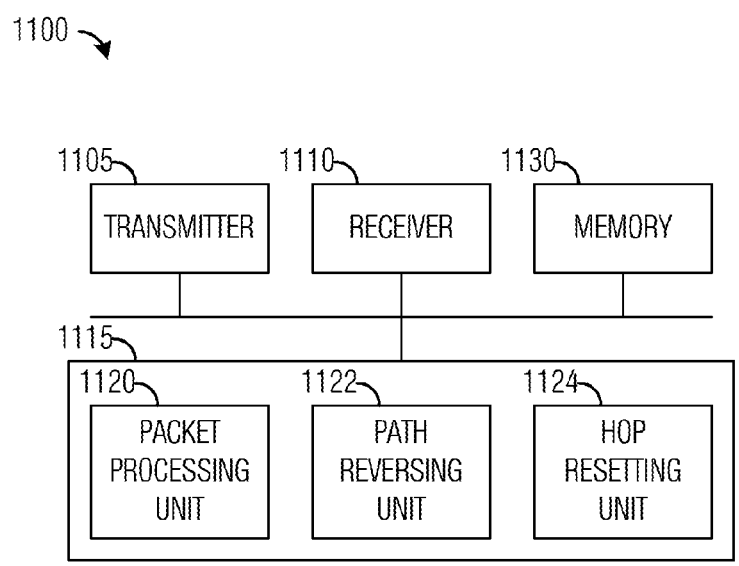
FIG. 11 illustrates an example second communications device according to example embodiments described herein.

FIG. 11 illustrates an example second communications device 1100. Communications device 1100 may be an implementation of a source node. Communications device 1100 may be used to implement various ones of the embodiments discussed herein. As shown in FIG. 11, a transmitter 1105 is configured to transmit packets, validation request packets, and the like. Communications device 1100 also includes a receiver 1110 that is configured to receive packets, validation request packets, and the like.

A packet processing unit 1120 is configured to process a received packet. Packet processing unit 1120 is configured to determine if the received packet is a validation request packet. Packet processing unit 1120 is configured to perform procedure(s), e.g., action type(s), instruction(s), operation(s), and the like, contained in a PV-header of the validation request packet. Packet processing unit 1120 is configured to store results of performing the procedure(s), e.g., action type(s), instruction(s), operation(s), and the like, in the payload of the validation request packet. Packet processing unit 1120 is configured to determine if the received packet is destined for communications device 1100. A path reversing unit 1122 is configured to reverse the order of hops stored in the validation request packet if communications device 1100 is the intended destination of the validation request packet. Path reversing unit 1122 is configured to use a path determining engine or table to identify a route for the validation request packet back to its source (which is referred to herein as a validation response packet) if communications device 1100 is the intended destination of the validation request packet. A hop resetting unit 1124 is configured to reset the next hop index in the validation request packet if communications device 1100 is the intended destination of the validation request packet. A memory 1130 is configured to store packets, validation request packets, received validation request packets, results stored in payloads, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while packet processing unit 1120, path reversing unit 1122, and hop resetting unit 1124 may be software modules executing in a microprocessor (such as processor 1115) or a custom circuit or a custom compiled logic array of a field programmable logic array. Packet processing unit 1120, path reversing unit 1122, and hop resetting unit 1124 may be modules stored in memory 1130.

Although the present disclosure and its advantages have been described in detail, it should be understood that various changes, substitutions and alterations can be made herein without departing from the spirit and scope of the disclosure as defined by the appended claims.

What is claimed is:

1. A method for operating a source node, the method comprising:
   receiving, by the source node, a data path validation request command requesting validation of a path associated with a traffic flow identified in the data path validation request command;
   determining, by the source node, an index-based source routing first hop sequence in accordance with the path being validated, wherein the first hop sequence is identical to an index-based source routing second hop sequence associated with a non-validation request packet associated with the path being validated;
   generating, by the source node, a validation request packet in accordance with the data path validation request command, the validation request packet comprising route information associated with the first hop sequence and specifying the path, an alert flag indicating the validation request packet needs to be examined by nodes receiving the validation request packet, and a path validation header specifying processing performed by the nodes receiving the validation request packet; and
   transmitting, by the source node, the validation request packet in accordance with the route information.

2. The method of claim 1, wherein the path validation header is configured to specify identical processing performed by all nodes receiving the validation request packet.

3. The method of claim 1, wherein the processing is specified implicitly.

4. The method of claim 1, wherein the generated validation request packet further comprises a payload field.

5. The method of claim 1, wherein the data path validation request command further comprises the specified processing.

6. The method of claim 1, further comprising receiving, by the source node, a validation response packet corresponding to the validation request packet from a destination node of the validation request packet.

7. The method of claim 6, wherein the alert flag is located in a packet header of the validation response packet.

8. The method of claim 6, wherein a payload of the validation response packet comprises results of the specified processing performed by nodes receiving at least one of the validation request packet or the validation response packet.

9. The method of claim 8, further comprising processing the results to validate the path.

10. The method of claim 6, wherein the validation response packet includes route information associated with a third hop sequence specifying a reverse path for the validation response packet between the destination node and the source node.

11. The method of claim 1, wherein the data path validation request command is received on one of a command line interface of the source node or a management console of a software defined network controller.

12. The method of claim 1, wherein the path validation header comprises at least one of an action type, an instruction, or an operation.

13. The method of claim 1, wherein determining the first hop sequence comprises copying the second hop sequence.

14. The method of claim 1, wherein the alert flag is located in a packet header of the validation request packet.

15. The method of claim 14, wherein the packet header comprises at least one existing field, and wherein the alert flag is located in the existing field of the packet header.

16. The method of claim 15, wherein the existing field is a hop size field.

17. The method of claim 14, wherein the alert flag is located in an alert flag field of the packet header.

18. The method of claim 1, wherein the alert flag is a two-valued indicator.

19. The method of claim 1, wherein the alert flag is a multi-bit indicator.

20. A method for operating a node, the method comprising:
   receiving, by the node, a validation request packet comprising an alert flag indicating the validation request packet needs to be examined by nodes receiving the validation request packet, an index-based source routing hop sequence specifying a path for the validation request packet, a hop index specifying a current hop in the hop sequence, a hop count of hops in the hop sequence, and a path validation header specifying processing performed by the nodes receiving the validation request packet; and
   performing, by the node, processing to produce a result in accordance with the path validation header.

21. The method of claim 20, further comprising storing, by the node, the result in a payload of the validation request packet.

22. The method of claim 20, further comprising:
   upon determining that the node is a destination of the validation request packet, identifying a reverse path for the validation request packet; and
   forwarding the validation request packet to a next node in accordance with the reverse path in response to the node being the destination of the validation request packet.

23. The method of claim 22, wherein forwarding the validation request packet comprises transmitting the validation request packet over a link in accordance with the reverse path.

24. The method of claim 22, wherein determining that the node is the destination comprises determining that the hop index is greater than the hop count.

25. The method of claim 20, further comprising:
   forwarding the validation request packet to a next node in accordance with the hop sequence in response to the node not being a destination of the validation request packet.

26. A source node comprising:
   a receiver configured to receive a data path validation request command requesting validation of a path associated with a traffic flow identified in the data path validation request command;
   a processor operatively coupled to the receiver, the processor configured to:
      determine an index-based source routing first hop sequence in accordance with the path being validated, wherein the first hop sequence is identical to an index-based source routing second hop sequence associated with a non-validation request packet associated with the path being validated, and generate a validation request packet in accordance with the data path validation request command, the validation request packet comprising route information associated with the first hop sequence and specifying the path, an alert flag indicating the validation request packet needs to be examined by nodes receiving the validation request packet, and a path validation header specifying processing performed by the nodes receiving the validation request packet; and a transmitter operatively coupled to the processor, the transmitter configured to transmit the validation request packet in accordance with the route information.

27. The source node of claim 26 wherein the processor is configured to generate the validation request packet with a payload field.

28. The source node of claim 26, wherein the receiver is configured to receive the data path validation request command from one of a command line interface of the source node or a management console of a software defined network controller.

29. The source node of claim 26, wherein the receiver is configured to receive a validation response packet corresponding to the validation request packet from a destination node of the validation request packet.

30. The source node of claim 29, wherein the validation response packet includes a third hop sequence specifying a second path for the validation response packet between the destination node and the source node.

31. The source node of claim 29, wherein a payload of the validation response packet comprises results of processing performed by nodes receiving at least one of the validation request packet or the validation response packet, and wherein the processor is configured to process the results to validate the first hop sequence for the validation request packet.

32. A node comprising:
a receiver configured to receive a validation request packet comprising an alert flag indicating the validation request packet needs to be examined by nodes receiving the validation request packet, an index-based source routing hop sequence specifying a path for the validation request packet, and a path validation header specifying processing performed by the nodes receiving the validation request packet; and a processor operatively coupled to the receiver, the processor configured to perform a procedure to produce a result in accordance with the path validation header.

33. The node of claim 32, wherein the processor is configured to store the result in a payload of the validation request packet.

34. The node of claim 32, wherein the processor is configured to
determine if the node is a destination of the validation request packet,
identify a reverse path for the validation request packet in response to the node being the destination of the validation request packet, and
forward the validation request packet to a next node in accordance with the reverse path in response to the node being the destination of the validation request packet.

* * * * *